(12) United States Patent
Overy

(10) Patent No.: US 6,732,197 B1
(45) Date of Patent: May 4, 2004

(54) PORTABLE CONTROLLER

(75) Inventor: Michael Overy, Alton (GB)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/831,409

(22) PCT Filed: Nov. 8, 1999

(86) PCT No.: PCT/GB99/03700

§ 371 (c)(1),
(2), (4) Date: May 28, 2002

(87) PCT Pub. No.: WO00/28403

PCT Pub. Date: May 18, 2000

(30) Foreign Application Priority Data

Nov. 8, 1999 (GB) .............................. 9824482

(51) Int. Cl.7 .............................................. G06F 13/28
(52) U.S. Cl. ............................. 710/8; 710/10; 710/14; 710/15; 710/16; 710/62; 710/72
(58) Field of Search ................................ 710/8, 10, 14, 710/15, 16, 62, 72

(56) References Cited

U.S. PATENT DOCUMENTS

| | | | |
|---|---|---|---|
| 5,410,326 A | | 4/1995 | Goldstein |
| 5,659,801 A | * | 8/1997 | Kopsaftis ..................... 710/62 |
| 6,023,736 A | * | 2/2000 | Lambeth et al. ............... 710/10 |
| 6,058,441 A | * | 5/2000 | Shu ............................. 710/100 |
| 6,088,357 A | * | 7/2000 | Anderson et al. ........... 370/392 |
| 6,342,010 B1 | * | 1/2002 | Slifer .......................... 463/39 |

FOREIGN PATENT DOCUMENTS

| | | |
|---|---|---|
| GB | 2 188 458 A | 9/1987 |
| GB | 2 250 118 A | 5/1992 |
| GB | 2 251 357 A | 7/1992 |
| GB | 2 269 031 A | 1/1994 |

\* cited by examiner

*Primary Examiner*—Rehana Perveen
(74) *Attorney, Agent, or Firm*—Antonelli, Terry, Stout & Kraus, LLP

(57) ABSTRACT

There is described a system for configuring the functionality of anyone of a plurality of devices by transferring control information from a portable controller thereto. The portable controller comprises: an input for receiving control information for configuring each device; memory circuitry arranged to store and retrieve control information for configuring each one of said plurality of devices; and an output for transferring to a device retrieved control information for that device. Each of the devices comprises: a user interface through which the user controls the device, means for coupling wirelessly with the output of the portable controller to transfer retrieved control information therefrom and control means arranged to configure the device in dependence upon the transferred control information by changing at least one of the functions provided by the device.

45 Claims, 6 Drawing Sheets

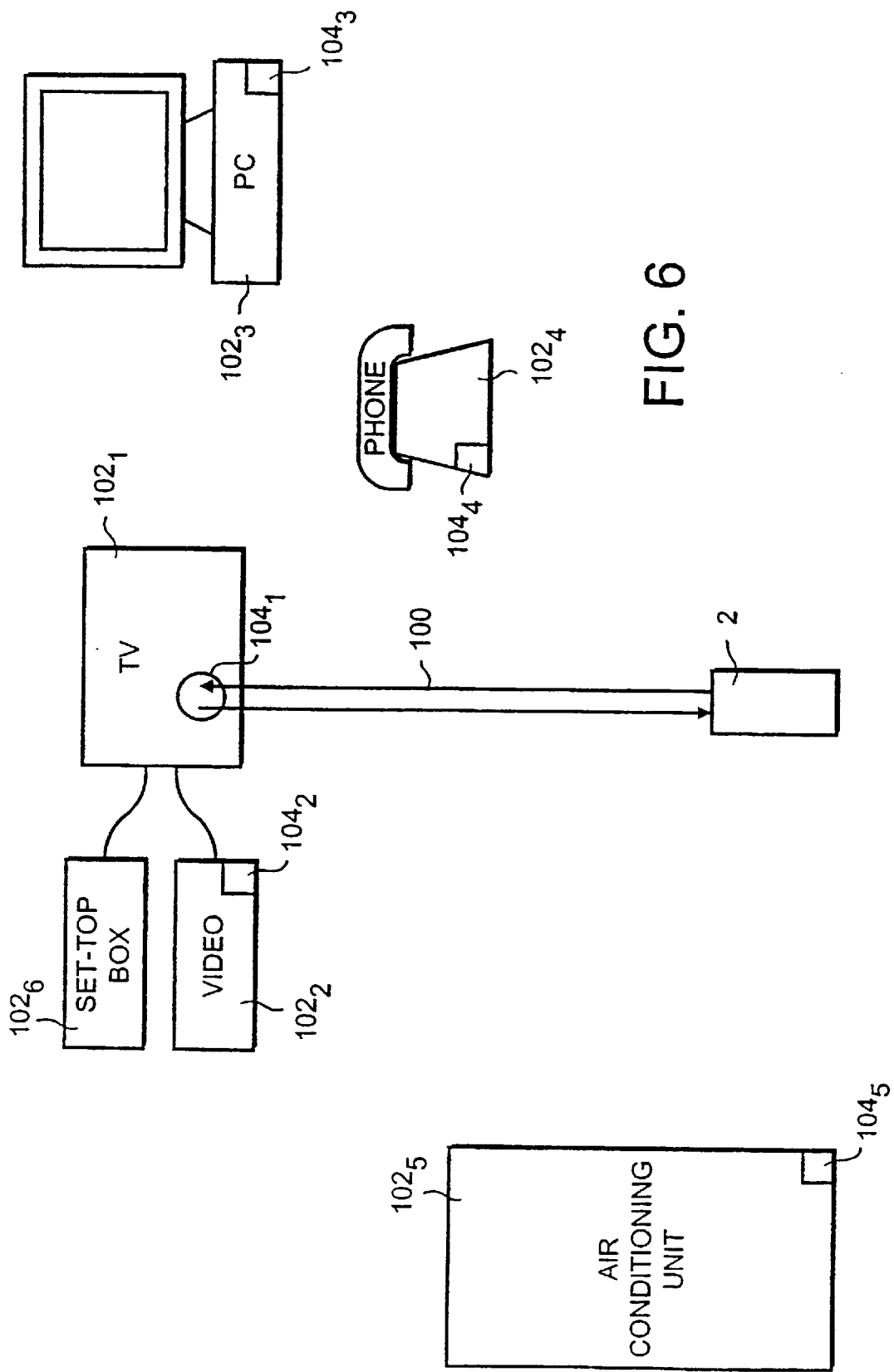

PORTABLE CONTROLLER

BACKGROUND OF THE INVENTION

1. Field of the Invention

The present invention relates to the configuration of anyone of a plurality of devices by transferring control information thereto. The invention particularly relates to a portable controller for storing and transferring the control information.

2. Description of the Prior Art

Electronic devices are very common and are becoming more so. The popularity of electronic devices arises in part due to their ability to perform many functions using a processor with software stored in a memory. It is possible to reuse hardware designs and upgrade the device by installing new software in the memory. When the electronic device provides an output or requires an input the nature of the output and input interfaces presented to a user are supported by the software. Input/output interfaces and software change from device type to device type and vary from manufacturer to manufacturer even for the same device. Consequently, there is an enormous range of different input and output interfaces with which persons who wish to use the different functions of a range of electronic devices have to familiarize themselves.

U.S. Pat. No. 5,497,411 describes a system in which a smart card is inserted into a device. The smart card controls which of the possible transactions performable by the device to which the user has access.

EP-A-0,626,635 and U.S. Pat. No. 5,410,326 relate to universal remote controls. The remote controls are able to control any one of a number of devices. However, they merely allow the user to remotely operate predefined functions of the device.

GB 2,296,584 and GB 2,296,801 describe a way of making devices appear familiar to a user. The user establishes user interface preferences which may be stored on a network or portable device. The preferences can be transferred from the portable device to an application device to change the application device's user interface attributes. Each user interface attribute is associated with a biological sense of a user (visual, audio, etc.). The user interface attributes associated with the visual sense relate to font type, font size, menu order preferences, window size, location of icons, patterns, colors and preference for analog or digital gauges or display graphs. Those preferences for user interface attributes which are common to multiple application devices are automatically reusable. Those preferences for attributes which are similar to but not held in common with other application devices are used as a basis to predict preferences for other application devices. These documents are concerned with how an application device can vary the appearance/presentation of its user interface to a user so that it appears more familiar. They are concerned with adapting how a device presents itself and not how it responds to user input.

U.S. Pat. No. 5,600,781 describes a computer system which is intended for use by a number of persons. The input user interface (a handwriting or voice recognition system) is customized to accommodate the personal preferences of each user. Each user's preferences can be stored on a separate PCMCIA card. The card adapts the device to convert a personal input (voice or handwriting) to a standard form reflecting the information content of the input.

It is not always easy to learn how to use the functions of a new device or to understand how to use the functions of a familiar device in unfamiliar circumstances. In particular it is not easy to understand how to use an input interface to perform a function if the input interface is unfamiliar or the accessible functions are unfamiliar. For example, a remote control for a television in a hotel room in a foreign country may be difficult to use as the content of the input interface is unfamiliar because the buttons of the control have different positions and different functions from manufacturer to manufacturer and are labelled in a foreign language. As another example, a personal computer or workstation which is not configured to have a familiar functionality including familiar applications and content will be difficult to use.

There is also a trend to add value to electronic devices by providing more functionality. Unfortunately, the provision of more functions often makes the control of the device more difficult and the input and/or output interfaces more complex. Advanced users of the electronic devices may wish to have access to all the functions at all times, however, normal users may prefer to have access to a more limited range of functions or access to functions with less features in return for a simpler interface or ease of use. For example, on a video recorder one user may only normally want to use the play, rewind, fast forward and stop functions whereas a second user may in addition normally want access to all the recording functions. As another example a user using an unfamiliar software application such as an unfamiliar or unpersonalized version of a word processing application would like to use their own personalized or familiar shortcut key strokes.

Once a user has set up a device to reflect his or her preferred functionality he or she may be reluctant to use the same or similar device which does not reflect those preferences.

Currently the onus lies with the user to adapt to each new product's functionality. It would be desirable to make electronic devices easier to use by reducing the burden placed on a user to adapt to each device. It would be desirable to make it easier to learn how to use a new device. It would be desirable to make it easier to make a familiar device easier to use in unfamiliar circumstances.

SUMMARY OF THE INVENTION

The present invention is based upon the realisation that although providing a familiar form of input or output to a device as in the prior art may engender a sense of familiarity, the user is still confronted with what may be unfamiliar functionality.

According to one aspect of the present invention there is provided a system for configuring the functionality of anyone of a plurality of devices by transferring control information from a portable controller thereto, wherein the portable controller comprises: input means for receiving control information for configuring each device; memory circuitry arranged to store and retrieve control information for configuring each one of said plurality of devices; and output means for transferring to a device retrieved control information for that device and wherein each of said devices comprises: a user interface means through which the user interacts with the device, means for wirelessly coupling with the output means of the portable controller to transfer retrieved control information therefrom and control means arranged to configure the device in dependence upon the transferred control information by changing at least one of the functions provided by the device.

According to another aspect of the present invention there is provided a portable controller for storing control information for a plurality of devices and for configuring the functionality of anyone of said plurality of devices by transferring control information thereto, comprising: input means arranged to couple wirelessly with anyone of said plurality of devices to receive control information therefrom for configuring another of said plurality of devices; memory circuitry arranged to store control information for configuring a particular device in association with the identity of the particular device and to retrieve control information associated with a particular device; and output means arranged to couple wirelessly with anyone of said plurality of devices and transfer thereto, retrieved control information associated with the device.

According to a further aspect of the present invention there is provided an electronic device comprising: processor means; user interface means, controllable by the processor means, through which the user interacts with the device; input means for receiving control information; and a memory for storing the received control information, wherein the processor means is arranged to read the control information stored in the memory and in dependence thereon configure the device by changing at least one of the functions provided by the device.

Functionality is how a device responds to user control. A change in functionality is a change in how a device responds to user control and may be evidenced by a technical change in what the device does and/or how it is controlled. A change of functionality may result in a change of input/output content, such as a change in control commands evidenced by a change of user interface, but it is not a mere change of input/output format, appearance, characteristics or ordering nor is it merely a change in which ones of a plurality of pre-existing functions provided by the device are accessible.

A change in what a device does or is capable of doing may be provided by changing the actual functions which are available to a user. This change may, for example, relate to any one of the following: changing the range of functions provided by the device (for example changing the mode of use of the device from complex to simple or visa versa); changing the software application which provides a particular function (e.g. word processing, email, browser); changing the content of files used in the control of software applications or the device (e.g. "autoexec.bat", "config.sys", "win.ini", bookmark files for a browser); or changing the device's response to predetermined inputs.

A change in how a device is controlled may be provided by changing the control functions provided by the device. This change may, for example, relate to the type or content of the user interface. For example, the type of user interface may be changed from voice activated to keyboard or visa versa. The content of a user interface may, for example, be changed in response to reflect the change in the functions provided by the device.

Another example of a change in how a device is controlled is a change in the input required to get a predetermined response.

It is possible to supplement a change in functionality by additionally controlling which of the functions provided by a device a user has access to, although this is not part of the present invention.

According to another embodiment in which the user interface means of the device comprises an input means having a display, configuring the user interface means changing the look and feel of the input means. Thus the interface may appear the same but have a different functionality or the interface may appear different and have a different functionality.

The control information defines the user's preferences and controls the configuring of the device. The control information may for example comprise software, settings, data or applications.

Thus embodiments of the invention provide a user with the means of automatically adapting the functionality of devices having user interfaces to suit their preferences thereby reducing the need for a user to adapt to devices.

Embodiments of the invention allow the user to determine the control information stored in the portable controller.

According to another invention, not currently claimed but forming part of this application, there is provided a system for configuring anyone of a plurality of devices by transferring control information from a portable controller thereto, wherein the portable controller comprises: an input for receiving control information for configuring each device ; memory circuitry arranged to store and retrieve control information for configuring each one of said plurality of devices; a first user input interface; and an output for transferring to a device retrieved control information for that device and wherein each of said devices comprises: a user interface through which the user controls the device, means for coupling wirelessly with the output of the portable controller to transfer retrieved control information therefrom and control means arranged to configure the device in dependence upon the transferred control information by replacing or augmenting the device's user interface with the portable controller's user input interface.

BRIEF DESCRIPTION OF THE DRAWINGS

For a better understanding of the present invention and to understand how the same may be brought into effect reference will now be made by way of example only to the accompanying drawings in which like reference numbers refer to like elements, wherein:

FIG. 6 illustrates a system having a number of separate devices and a portable controller storing control information for configuring anyone of the devices.

DETAILED DESCRIPTON OF THE INVENTION

Figure 1:
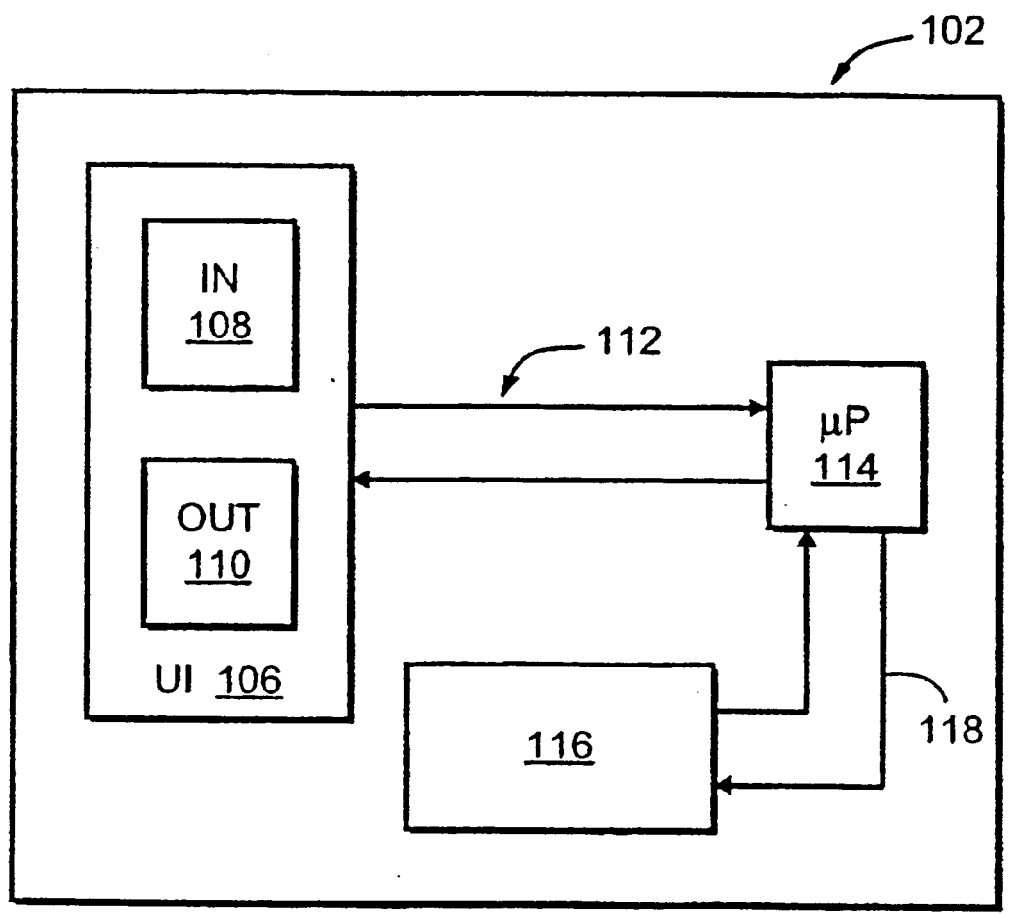
FIG. 1 schematically illustrates the components one type of device in the prior art, FIG. 2 schematically illustrates the components of a device and a controller, according to one embodiment of the present invention.

FIG. 1 illustrates an electronic device 102 according to the prior art. The electronic device has a user interface 106, a processor 114 and a memory 116. The user interface has an input interface for receiving input to the device 102 and/or an output interface for producing an output from the device. The processor is in communication with the interface 106 through an interconnect 112 and with the memory 116 through an interconnect 118. The memory 116 stores software which controls the interface 106 through the processor 114. The functionality of the device 102 and the interface 106 is controlled by the software. The device 102 may be any device which requires an input from a user. A device may for example be a television. The input interface 108 would include a socket for an aerial, and a controller (possibly remote) for selecting the channel, setting the volume, brightness, color and contrast and for turning the device on and off. An output interface 110 would include a screen and at least one loud speaker.

Figure 2:
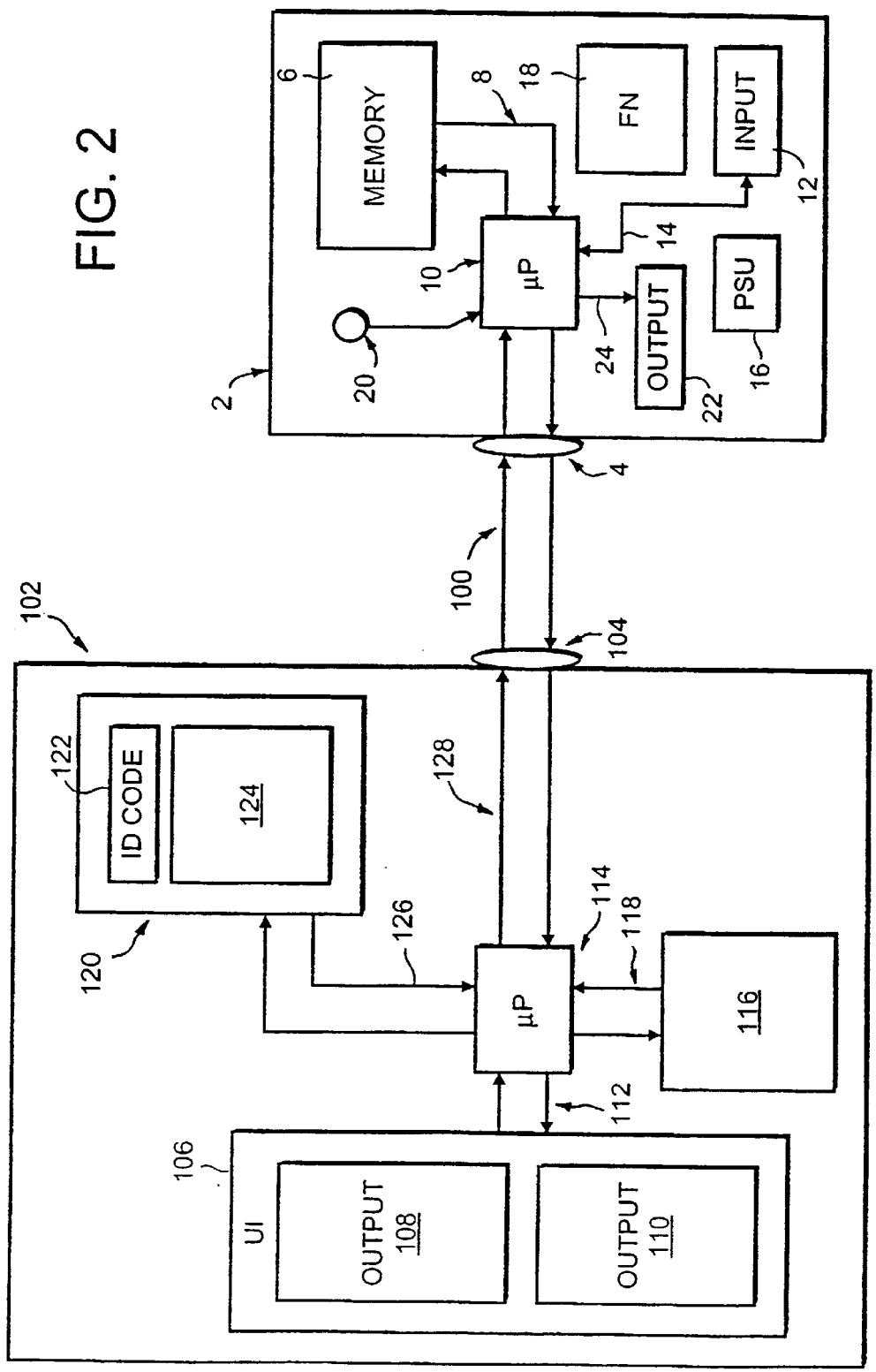

FIG. 2 illustrates an adapted device 102 and a portable controller 2 in accordance with one embodiment of the present invention. The adapted device is similar to the device 102 illustrated in FIG. 1 but has an additional memory 120 and a port 104. The port 104 is connected via interconnect 128 to the processor 114. The processor receives control information 100 from the portable controller 2 and supplies control information 100 to the portable controller 2 via the port 104 and interconnect 128. The additional memory 120 which may in practice be a portion of the memory 116 is attached to the processor 114 through interconnect 126. The additional memory 120 has a first portion 122 which stores an ID code which identifies the device and a second portion 124 which stores software. This software controls how the processor responds to control information received from the portable controller 2 and controls the control information provided by the processor 114 to the portable controller 2.

The portable controller 2 according to this embodiment has a processor 10, a memory 6 for storing control information, a switching element 20 for controlling the transfer of control information between the portable controller 2 and the device 102, a port 4 for supplying control information to and receiving control information from the device 102, an output 22 for giving information to a user, an input 12 for receiving an input from a user, functional circuitry 18 and a power supply unit 16. The switching element may be user activated or automatically activated and be provided as hardware or software. The processor receives an input from the switching element, writes to and reads from the memory 6 via an interconnect 8, controls the input 12 and receives signals therefrom via interconnect 14 and controls the output 22 by signal 24. The functional circuitry 18 represents the circuitry necessary for the portable controller 2 to be able to perform other functions ancillary to the present invention. For example, the functional circuitry 18 may allow the portable device to be additionally used as a mobile phone, a personal organizer, a clock etc. The power supply device 16 is a battery cell which supplies power to the other elements in the portable controller 2. The memory 6 is preferably some form of non-volatile memory which can be written to and read from. Electrically erasable programmable read-only memory (EEPROM or 'flash memory') is suitable.

The communication of control information between the device 102 and the portable controller 2 may be achieved by any suitable means. An electrical connection could be made between the port 104 and port 4. Preferably, the ports could be radio transceivers with the control information being transmitted as radio waves between them. Such transmission would preferably be point to point. UK Patent Application No 9820860.6 filed Sep. 24, 1998 describes a low power radio frequency communication scheme (Bluetooth) which could be used to effect communication between the controller 2 and a device 102 and the contents of this application are herewith included by reference. Another alternative would be to use Infra-Red (IR) transceivers as the ports 104 and 4 with the control information being transmitted as IR radiation between them.

Activation of the switching element 20 to a first position causes the processor 10 to enter a 'receiving mode' and activation of the element 20 to a second position causes the processor to enter a 'transmitting mode'. The switching element 20 may be implemented as hardware or software. In the 'receiving mode' the processor 10 receives control information 100 from the device 102 and stores the control information in the memory 6. Typically the device will have been configured by a user to reflect their preferences before entering the receiving mode and the control information transferred identifies these preferences. In the 'transmitting mode' the processor sends the control information from the memory 6 of the portable controller 2 to the device 102. The control information identifies the user's functional preferences and the device 102 automatically re-configures itself to reflect these preferences.

On entering the receiving mode the processor 10 sends a request to the device 102 for control information 100. This request is sent from port 4 to port 104. The processor 114 in the device 102 receives the request and enters a 'set-up' mode. The processor under the control of the software in the memory 6 identifies the settings of the device which are user alterable and then identifies which of those settings differ from the default or factory pre-set functions that is those functions which have been altered or added by the user. These settings represent a set of altered or preferred settings. The processor under the control of the software may allow the user to identify preferences such as settings, software, applications or data which that are wished to be available when the same or similar device is configured by the portable controller. These preferences represent a set of chosen settings. The control information 100 comprises information defining the user's preferences including the preferred settings and any chosen settings.

The user's preferences include the information for configuring the functionality of the device. Reconfiguration may change the manner in which a user can control the device. In particular it may change the way in which the user controls the device via the user interface 106.

The control information is transmitted with the ID code of the device. This code identifies the device as a particular type. For example the first n significant bits (Device ID) may identify the type of device e.g. television, phone, video recorder etc. The next few significant bits (Model ID) may identify the manufacturer and model. The control information and ID code is sent from the device 102 to the portable controller 2. The processor 10 of the portable controller 2 identifies the ID code and stores the control information in the memory 6. One way of storing the control information will now be described with reference to FIG. 3. The processor reserves a portion α of the memory 6 as a look-up table. The processor translates the ID code into a starting address a in the memory 6 to which the control information including the preferred and any chosen settings will be written. The control information is written into the memory in an ordered fashion with the last bit occupying an address b. A entry is made in the look-up table comprising the ID code, the starting address a, and the end address b. The control information is stored in two logical layers. The upper layer identifies the preference types A, B, C . . . and gives a pointer to the portion of the lower layer which stores the actual settings, applications, software or data which effect the preferences on a device 102. On successfully storing the control information, the processor returns an acknowledgement to the device 102 and provides a signal to the user via the output 22. A failure in the transfer process may also be indicated via the output 22.

It is preferable for the processor 114 in the device 102 to flag those preferences, which are common to all devices with the same Device ID of the ID code, in the control information before transmission to the portable controller 2. In this instance the processor will create two separate entries in the look-up table. One entry under the full ID code which identifies the memory area storing all the preferences and one entry under the Device ID which identifies the memory area storing only the flagged preferences. As the flagged preferences are a subset of the preferences it is not necessary to store the flagged preferences twice. Instead the two upper layers associated with the two different look-up table entries can point to the same part of the memory storing the flagged preferred settings.

Figure 3:
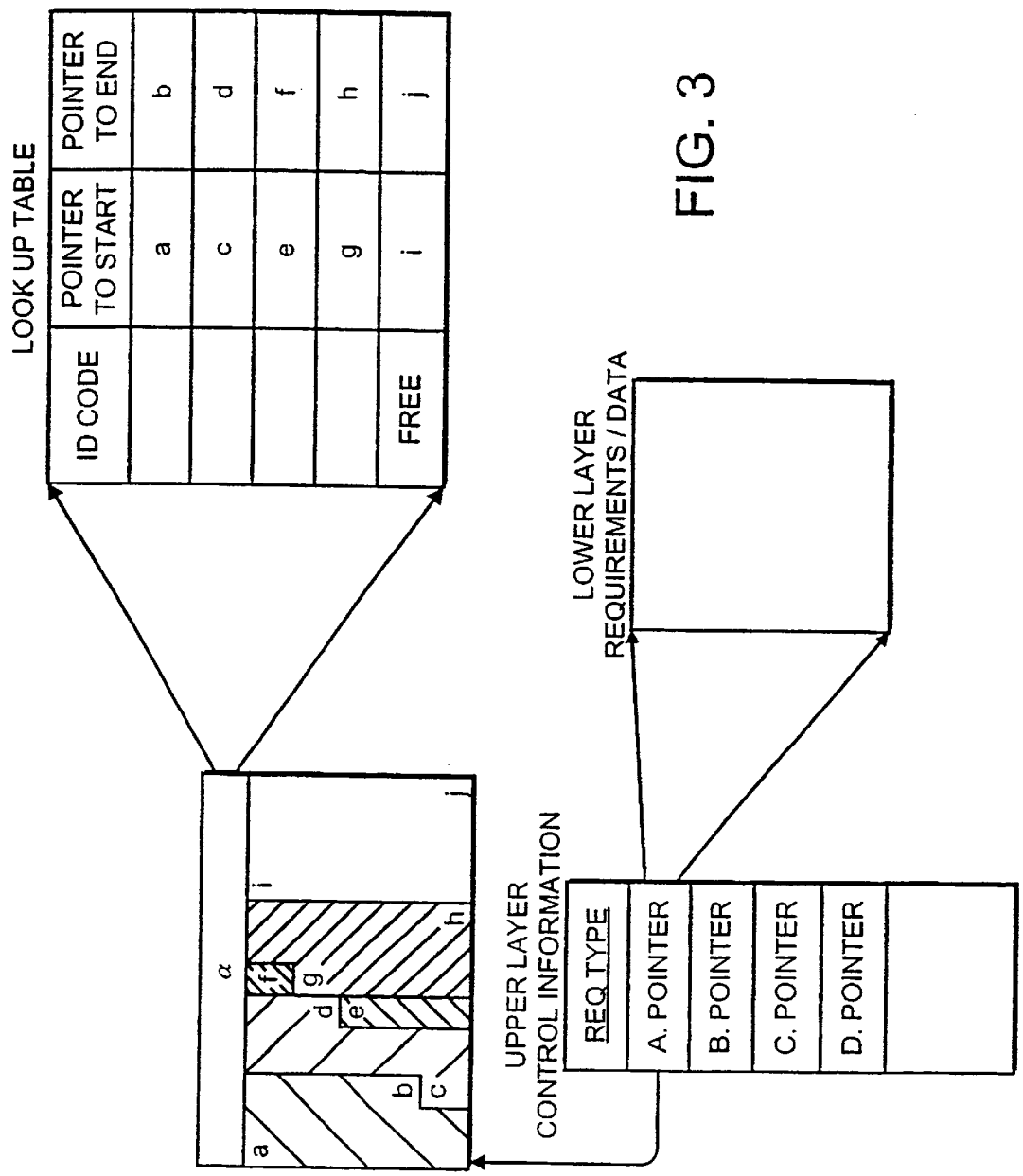
FIG. 3 illustrates one scheme for organizing the storage of control information in the memory of the portable controller.

Referring to FIG. 3 the portions of the memory c–d, e–f, g–h each represent the portion of memory which stores the control information for different devices. The portion i–j is available memory.

On entering the 'transmitting mode' the portable controller 2 sends a transmission request to the device 102. The processor 114 of the device 102 responds by reading the ID code from memory 120 and transmitting it via port 104 to the portable controller 2 and by loading and executing the software in the portion 124 of memory 120. The processor 10 in the portable controller decodes the received ID code identifying the device 102. It then accesses the portion of the memory 6 storing the control information associated with that device identity and transmits the control information to the device 102 via port 4. The particular method of accessing the control information will be described with reference to FIG. 3. The processor 10 accesses the reserved portion α of the memory 6 and reads the look-up table from the memory. The processor searches the look-up table for an entry having the same ID code as the one received from the device 102. If an entry is found, the control information in the memory portion identified in the look-up table is read and transmitted to the device 102. If an entry is not found, the processor searches the look-up table for an entry having the same Device ID as that found in the first portion of the ID code received from the device 102. If the second entry is found, the control information in the memory portion identified in the look-up table is read and transmitted to the device 102. If the second entry is not found, a null signal is sent to the device 102 instructing it to use the present settings or, alternatively, the default settings of the device and the user is informed via output 22.

The processor 114 under the control of the software in the memory 120 receives the control information or null signal from the portable device 2. It identifies what if any preferences need to be implemented. This may require identifying which settings need to be adjusted and determining how much they should be adjusted by. The processor 114 then controls the adjustment. It may also require storing any software, application or data received as a preference in memory 116 and allowing access thereto. On completion of implementing the preferences, the processor sends a signal back to the portable controller 2 indicating that the adjustment has been successfully completed. The portable device informs the user via the output 22.

Thus the device 102 is configured and the functionality of the device 102 as it appears to a user is changed.

Voice activated control of devices is becoming more prevalent, however, to be able to control a device a user and device have to agree on command words and the device has to recognize those command words when spoken. This generally requires the device to be trained by the user. The portable controller can avoid or alleviate these problems. In one embodiment the portable controller stores information defining the user's voice attributes such as language used, command words used and attributes which allow the device to understand the user's voice and/or differentiate it from other's voices. The portable controller transfers this information to a device thereby allowing the user to control the device using voice commands. In another embodiment, the input 12 of the portable controller accepts voice commands from the user. When the portable controller configures the functionality of a device, the input 12 of the portable controller becomes the input for the configured device and the configured device can be controlled by voice commands given to the input 12 of the portable controller. In this embodiment, the portable controller stores information defining the user's voice attributes which allow the controller to understand the user's voice commands and/or differentiate it from other's voices. The memory 6 could be arranged to have a dedicated portion which defines the user's voice attributes. The portable controller 2 could be arranged to always transfer the voice attributes or other control information to the device 102 in the transmitting mode even if the look up table does not contain an entry for the ID code or the Device ID. This allows the portable controller to be used to configure the functionality of a new device or a device which is new to the portable controller.

In the foregoing description of the receiving mode, the control information was described as being received from a device 102. However, as an alternative the preferred settings could be input directly into the portable controller via the input 12. Alternatively, a computer or other device could provide the control information to the port 4.

In the foregoing embodiment, the switching element is described as part of the portable controller 2. It could however be part of the device 102 instead and it may be implemented as hardware or software.

It is desirable but not essential to have the output 22 to keep the user informed of progress. The input 12 is optional. The PSU is optional as power could be supplied from the device 102 via port 4. The functional circuitry 18 is optional.

Figure 4B:
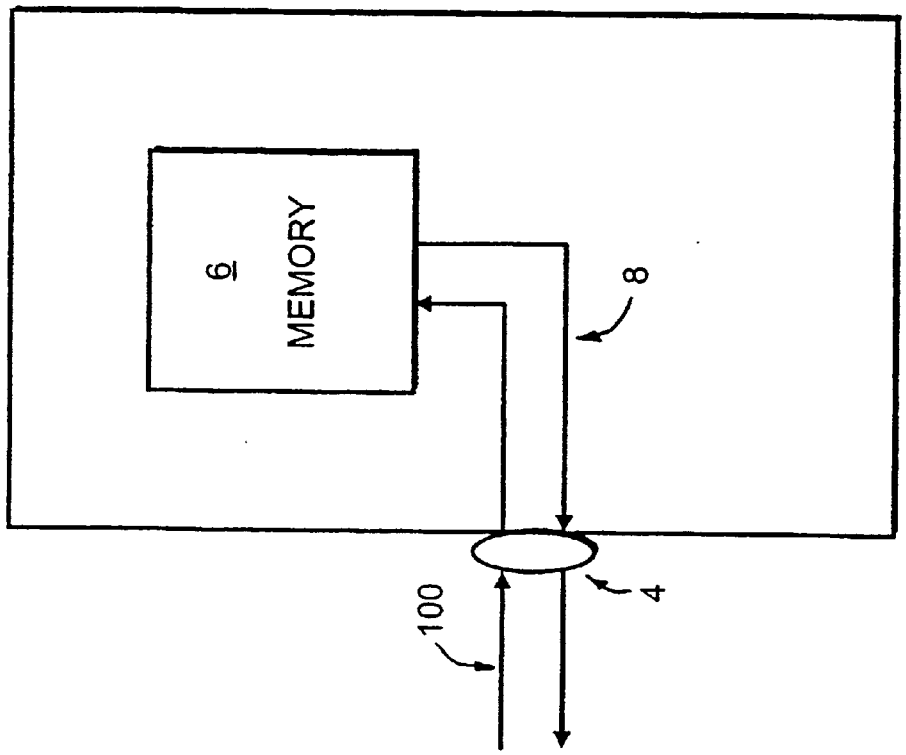
FIGS. 4a and 4b schematically illustrate the components of other portable controllers.
Figure 4A:
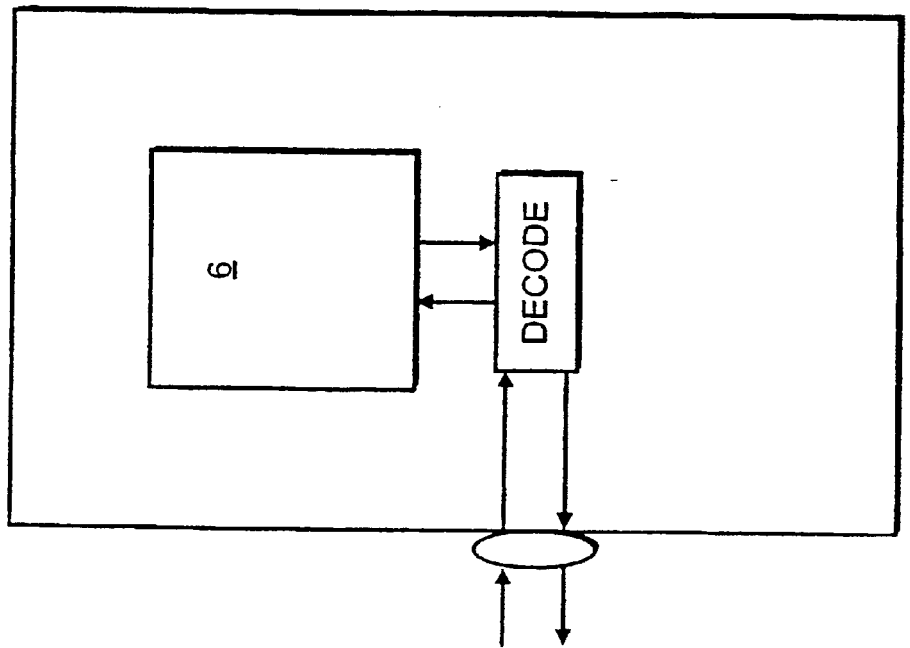

Referring to FIG. 4a there is illustrated an alternative portable controller 2. The portable controller has none of the optional elements listed above. In addition, it has decoding circuitry instead of a processor. The decoding circuitry simply performs the functionality described with relation to FIG. 3. The decoding circuitry writes control information to the memory 6 in association with a particular device so that the portable controller can retrieve the correct control information when it needs to reconfigure the same or similar device.

Referring to FIG. 4b there is illustrated an alternative portable controller 2 which may be a wireless memory card. The portable controller has none of the optional elements listed above. In addition it has no processor or decoding circuitry but it does have a port 4 and memory 6. The functionality of the portable controller in FIG. 4b is similar to that in FIG. 4a except that the decoding to access the memory 6 to store and retrieve the control information 100 is performed in the device 102 (not shown). This may necessitate the memory 6 having portions dedicated to specific types of devices so that no conflict between dissimilar devices arises. Alternatively, the memory may store each preference separately with its own address so that each preference can be accessed separately.

According to some embodiments of the present invention the portable controller 2 has an input 12. This input in one embodiment comprises a menu key. When the menu key is pressed a signal is sent to the device 102 which shows a menu temporarily on the output 110 of the device 102 (if present). This menu may identify the function of other keys of the input 12 when used in conjunction with the device 102. The menu may display functions as icons or text which are selectable by the user for example by pointing and clicking using a cursor control and selection device on the input 12. Thus the input 12 may replace or augment the user input of the device.

Figure 5B:
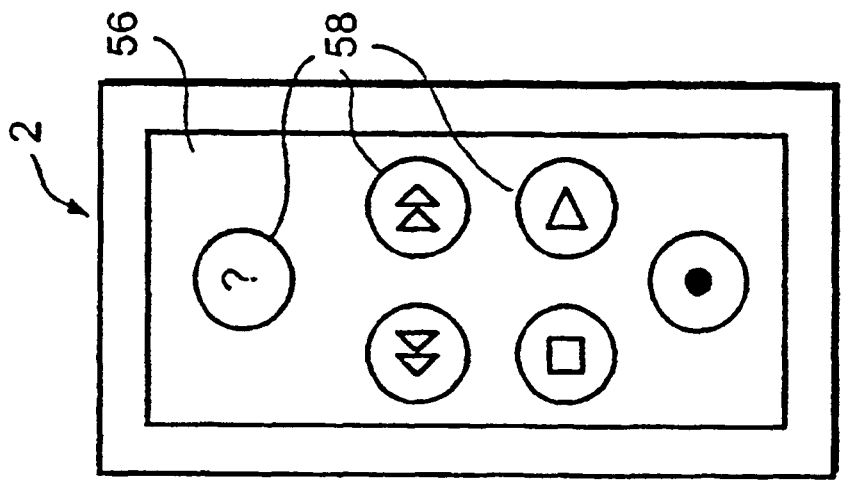
FIGS. 5a and 5b schematically illustrate possible user interfaces on the portable controller.
Figure 5A:
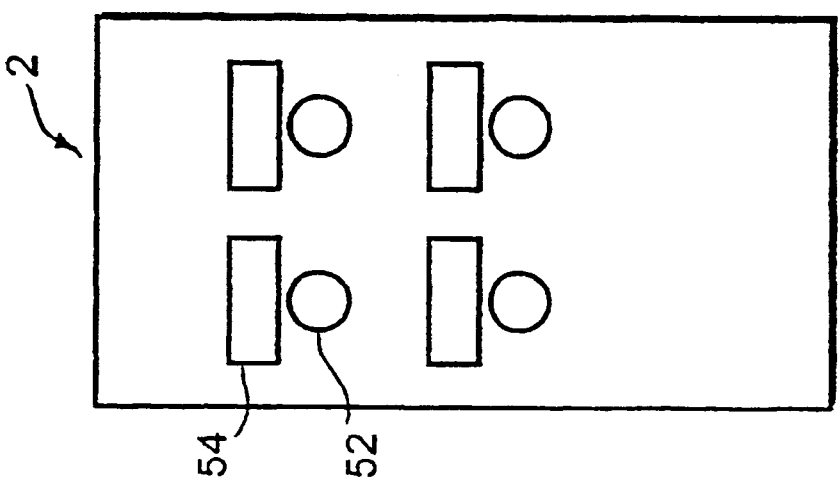

The input 12 according to another embodiment comprises a keypad with a plurality of keys as illustrated in FIG. 5a. Each key 52 has associated with it has an LCD display 54 (or part of an LCD screen) for displaying a legend. After the portable controller sends control information to the device 102 the input 12 of the portable controller is reconfigured. The processor 114 of the device sends back to the portable controller information with specifies the function of the keys of the portable controller 2. The legend associated with a key displays the function of the key and pressing the key remotely controls the device 102 to perform the function.

The input 12 according to another embodiment comprises a touch sensitive LCD screen 56 as illustrated in FIG. 5b. When control information is sent to the device 102 it returns information which defines not only the function but also the appearance of the input 12. The LCD screen may show the symbols 58 used to represent functions with or without text explanation. For example, if the portable controller was emulation a video controller '<<' represents rewind, '>>' represents fast forward, '•' represents record, etc. The LCD screen may allow help-messages to be displayed. The LCD screen may also allow complex functions to be performed as a series of simple choices requiring a yes/no input or a simple input. The choice presented as a question could be displayed on the screen with the answers provided adjacent thereto as symbols. By touching the screen where a symbol is displayed, the portable controller 2 controls the device 102 to perform the function associated with the symbol.

FIG. 6 illustrated a system comprising a portable controller 2 and a plurality of devices 102 including a television, a video recorder, a personal computer, a phone, an air conditioning unit and a set-top box. Each of the devices illustrated have inputs and can be re-configured by means of the portable controller 2. Although particular devices are shown it should be appreciated that any device with an electronically controller user interface is suitable.

The portable controller may hold control information for each of the devices 102 illustrated.

The TV illustrated is a digital TV. The portable controller may associate with the ID code of the TV the user preferences. One possible preference could identify whether the user has access rights to all types of programs or to only a subset, for example, because the user has a limited personal subscription with the program provider or because the user is barred from viewing explicitly sexual or violent programs. A further preference could control the type of program which a user is prompted to view for example movies, drama, thriller, world news, business news, comedy etc. Another preference could provide to a TV the software necessary to play a favorite game using the TV as a monitor. In the event of the TV being linked to the world wide web (WWW) via a set top box, then the user's bookmarks could be transferred and displayed for example as icons on the TV screen.

The portable controller may associate with the ID code of the personal computer illustrated in FIG. 6, the user's preferences for a PC. The preferences may include data files defining the preferred settings such as 'autoexec.bat', 'config.sys' and 'win.ini' files commonly used to control. PCs at present. The preferences may also contain access rights and application files which provide the software required to run the user's preferred applications.

The portable controller may associate with the ID code of the phone illustrated in FIG. 6, the user's preferences for a phone. The preferences may include a preference which enables the phone to respond to spoken input from the user, these preferences may include an indication of the language spoken, a phonetic dictionary of the user and the user's address book. Alternatively the preferences may enable the phone to adapt its quick dial function to allow a user to dial a desired phone number from their phone book via the phone using a single key press. The portable controller may also store as control information access codes for authorizing access to a telephone network and controlling the charging of the cost of the access to the user's charging account.

For some applications it would be desirable for the device to be automatically configured when the portable controller is nearby. A simple arbitration scheme could be used to handle the situation when there is more than one portable device within range. For other applications it would be desirable for the device to be aware of when a user no longer requires it to be configured to his or her preferences for example when the user leaves the device. The device is able to check whether the portable controller is within a specified range of the device. This range could vary from device to device. When the user and portable device move outside the range the device could automatically reconfigure to the default settings or switch off. Alternatively the user could be provided with the option of manually informing the device so that it can reconfigure or switch off.

Although particular embodiments of the present invention have been described in the foregoing description, it should be appreciated that various modifications may be made therein without departing from the spirit or scope of the invention.

What is claimed is:

1. A system for configuring the functionality of anyone of a plurality of devices by transferring control information from a portable controller thereto to change at least one function which is available to a user of any one of the plurality of devices during use thereof in accordance with the user's preference, wherein the portable controller comprises:

an input for receiving control information for configuring each device to change the function which is available to the user of any one of said plurality of devices during use in accordance with the user's preference; memory circuitry arranged to store and retrieve control information for configuring each one of said plurality of devices; and an output for transferring to a device retrieved control information for that devices and wherein each of said devices comprises a user interface through which the user controls the device, means for coupling wirelessly with the output of the portable controller to transfer retrieved control information therefrom and control means arranged to configure the device in dependence upon the transferred control information by changing at least one of the functions provided by the device during use in accordance with the user's preference.

2. A system as claimed in claim 1, wherein configuring the functionality of the device adapts or augments the functions provided by the device.

3. A system as claimed in claim 1, wherein configuring the functionality of the device adapts or augments the range of functions providable by the device.

4. A system as claimed in claim 3 wherein configuring the functionality of the device changes the device's mode of operation to more or less complex.

5. A system as claimed in claim 1, wherein configuring the functionality of the device comprises providing software stored in the controller to the device.

6. A system as claimed in claim 1, wherein configuring the functionality of the device comprises changing a software application used to provide a particular function.

7. A system as claimed in claim 1, wherein configuring the functionality of the device comprises changing the files used in the control of software applications or of the device itself.

8. A system as claimed in claim 1, wherein configuring the functionality of the device comprises changing the function performed in response to a predetermined input or inputs.

9. A system as claimed in claim 1, wherein configuring the functionality of the device comprises changing the input required to perform a predetermined function.

10. A system as claimed in claim 1, wherein configuring the functionality of the device adapts or augments the user control of a device available via the user interface.

11. A system as claimed in claim 10, wherein configuring the functionality of the device adapts or augments the types of input or output providable via the user interface.

12. A system as claimed in claim 10, wherein configuring the functionality of the device adapts, reduces or augments the content of the user interface displayed to a user.

13. A system as claimed in claim 1, wherein the means for coupling comprises an IR or radio wave transceiver.

14. A system as claimed in claim 1, wherein the user interface means of the device is electronically controlled.

15. A system as claimed in claim 1, wherein on reconfiguring the device, a user interface on the portable controller replaces or augments the user interface means of the device.

16. A system as claimed in claim 1, wherein the device comprises a processor and memory, wherein the memory stores the transferred control information and the processor controls said user interface means, reconfiguring it in dependence upon the received control information.

17. A system as claimed in claim 1, wherein the portable controller comprises:
input means arranged to couple wirelessly with anyone of said plurality of devices to receive control information therefrom for configuring another of said plurality of devices;
memory circuitry arranged to store control information for configuring a particular device in association with the identity of at least the particular device and to retrieve control information associated with a particular device; and
output means arranged to couple wirelessly with anyone of said plurality of devices and transfer thereto retrieved control information associated with the device.

18. A portable controller for storing control information for a plurality of devices and for configuring the functionality of anyone of said plurality of devices by transferring control information thereto to change at least one function which is available to a user of any one of said plurality of devices during use thereof in accordance with the user's preference, comprising:
input means arranged to couple wirelessly with anyone of said plurality of devices to receive control information therefrom for configuring another of said plurality of devices to change the at least one function which is available to the user of any one of said plurality of devices during use thereof in accordance with the user's preference;
memory circuitry arranged to store control information for configuring a particular device in association with the identity of at least the particular device and to retrieve control information associated with a particular device; and
output means arranged to couple wirelessly with anyone of said plurality of devices and transfer thereto retrieved control information associated with the device.

19. A portable controller as claimed in claim 18 wherein the memory circuitry is arranged to retrieve control information associated with a device in response to receiving a signal comprising the identity of the device, said control information having been previously stored in association with the identity.

20. A portable controller as claimed in claim 18, wherein the memory circuitry comprises decoding means for decoding the identity of a device and controlling, in accordance with said decoding, which portions of a memory are retrieved.

21. A portable controller as claimed in claim 18, wherein the memory circuitry comprises a look-up table for associating the identity of devices with their respective control information.

22. A portable controller as claimed in claim 21 wherein the look-up table is arranged to assign portions of memory to each identity.

23. A portable controller as claimed in claim 18, wherein said output means comprises means for establishing a bi-directional link with a device and for performing a handshaking procedure with the device.

24. A portable controller as claimed in claim 23, wherein said bi-directional link transfers the identity of a device to the personal controller and transfers control information from the personal controller to the device.

25. A portable controller as claimed claim 18, wherein said output means comprises an electrical interface or IR interface or radio interface.

26. A portable controller as claimed in claim 18, wherein the input means is adapted to allow the user to change or vary the stored control information.

27. A portable controller as claimed in claim 18, wherein the input means is arranged to receive control information directly from anyone of a plurality of different devices.

28. A portable controller as claimed in claim 18, wherein said input means comprises means for establishing a bi-directional link with a device and for performing a handshaking procedure with the device.

29. A portable controller as claimed in claim 28, wherein said bi-directional link identifies the device to the personal controller and transfers control information from the device to the personal controller.

30. A portable controller as claimed in claim 18, wherein said input means comprises an IR interface or radio interface.

31. A portable controller as claimed in claim 18, wherein said input means and output means are integrated.

32. A portable controller as claimed in claim 18, further comprising user input means comprising a key pad having legends.

33. A portable controller as claimed in claim 18, comprising user input means comprising a touch sensitive pad and/or a cursor control device.

34. A portable controller as claimed in claim 18, further comprising processor means for controlling the input means, memory circuitry and output means.

35. A portable controller as claimed in claim 18 further comprising additional functional circuitry.

36. The use of a portable controller as claimed in claim 18 to change the functionality of anyone of a plurality of devices.

37. An electronic device comprising: processor means; user interface means, controllable by the processor means, through which the user interacts with the device; input means for receiving control information to change at least one function which is available to a user of the electronic device during use thereof in accordance with the user's preference; and a memory for storing the received control information, wherein the processor means is arranged to read the control information stored in the memory and in dependence thereon configure the device by changing at least one of the functions provided by the device to the user during use.

38. An electronic device as claimed in claim 37 wherein said memory is an additional memory.

39. An electronic device as claimed in claim 37 wherein said input means comprises means for establishing a bi-directional link and for performing a handshaking procedure to enable the reception of the control information.

40. An electronic device as claimed in claim 39 wherein said processor means is arranged to identify the device by providing an identity code during said handshaking procedure to the input means for transmission in the bi-directional link.

41. An electronic device as claimed in claim 37 further comprising output means wherein said processor means is arranged to produce control information defining the device configuration and transmit the control information via the output means.

42. An electronic device as claimed in claim 41 wherein said input means and said output means are integral.

43. A system comprising an electronic device as claimed in claim 37 and a portable controller comprising:
input means arranged to couple wirelessly with anyone of a plurality of devices to receive control information therefrom for configuring another of said plurality of devices;
memory circuitry arranged to store control information for configuring a particular device in association with the identity of at least the particular device and to retrieve control information associated with a particular device; and
output means arranged to couple wirelessly with anyone of said plurality of devices and transfer thereto retrieved control information associated with the device.

44. A method of changing the functionality of a device comprising the steps of:
storing in a portable controller control information arranged to automatically control the functionality of a device when transferred thereto to change at least one function which is available to a user in accordance with the user's preference;
physically transporting the portable controller to the device;
establishing a wireless communication link between the portable controller and the device;
transferring via the wireless communication link stored control information from the portable controller to the device to change at least one function which is available to the user of the device in accordance with the user's preference; and
changing the functionality of the device in response to the transferred control information by changing the at least one of the functions provided by the device to the user thereof.

45. A method of changing the functionality of any one of a plurality of devices comprising the steps of:
in a portable controller, storing distinct control information for each of said plurality of devices, the control information for a device being associated with at least that device in the portable controller and arranged to automatically control the functionality of that device when transferred thereto to change at least one function which is available to a user in accordance with the user's preference;
physically transporting the portable controller to a first one of said plurality of devices;
establishing a wireless communication link between the portable controller and the first device;
identifying the first device;
transferring via the wireless communication link stored control information associated with the first identified device from the portable controller to the first device to change at least one function which is available to the user of the device in accordance with the user's preference; and
changing the functionality of the first device in response to the transferred control information by changing at least one of the functions provided by the device.

* * * * *

UNITED STATES PATENT AND TRADEMARK OFFICE
CERTIFICATE OF CORRECTION

PATENT NO. : 6,732,197 B1
DATED : May 4, 2004
INVENTOR(S) : Michael Overy

It is certified that error appears in the above-identified patent and that said Letters Patent is hereby corrected as shown below:

Title page,
Item [30], please change:
"(30) Foreign Application Priority Data: Nov. 8, 1999…(GB)……….9824482"
to read:
-- (30) Foreign Application Priority Data: Nov. 8, 1998…(GB)……….9824482 --.

Signed and Sealed this

Nineteenth Day of October, 2004

JON W. DUDAS
*Director of the United States Patent and Trademark Office*

UNITED STATES PATENT AND TRADEMARK OFFICE
CERTIFICATE OF CORRECTION

PATENT NO. : 6,732,197 B1
DATED : May 4, 2004
INVENTOR(S) : Michael Overy

It is certified that error appears in the above-identified patent and that said Letters Patent is hereby corrected as shown below:

<u>Title page,</u>
Item [30], please change "[30] Foreign Application Priority Data: Nov. 8, 1999... (GB).........9824482" to read -- [30] Foreign Application Priority Data: Nov. 9, 1998... (GB).........9824482 --.

Signed and Sealed this

Eleventh Day of January, 2005

JON W. DUDAS
*Director of the United States Patent and Trademark Office*